March 7, 1933.  F. V. HAMMERLY  1,900,809
SEWAGE PURIFICATION SYSTEM
Filed Feb. 26, 1929
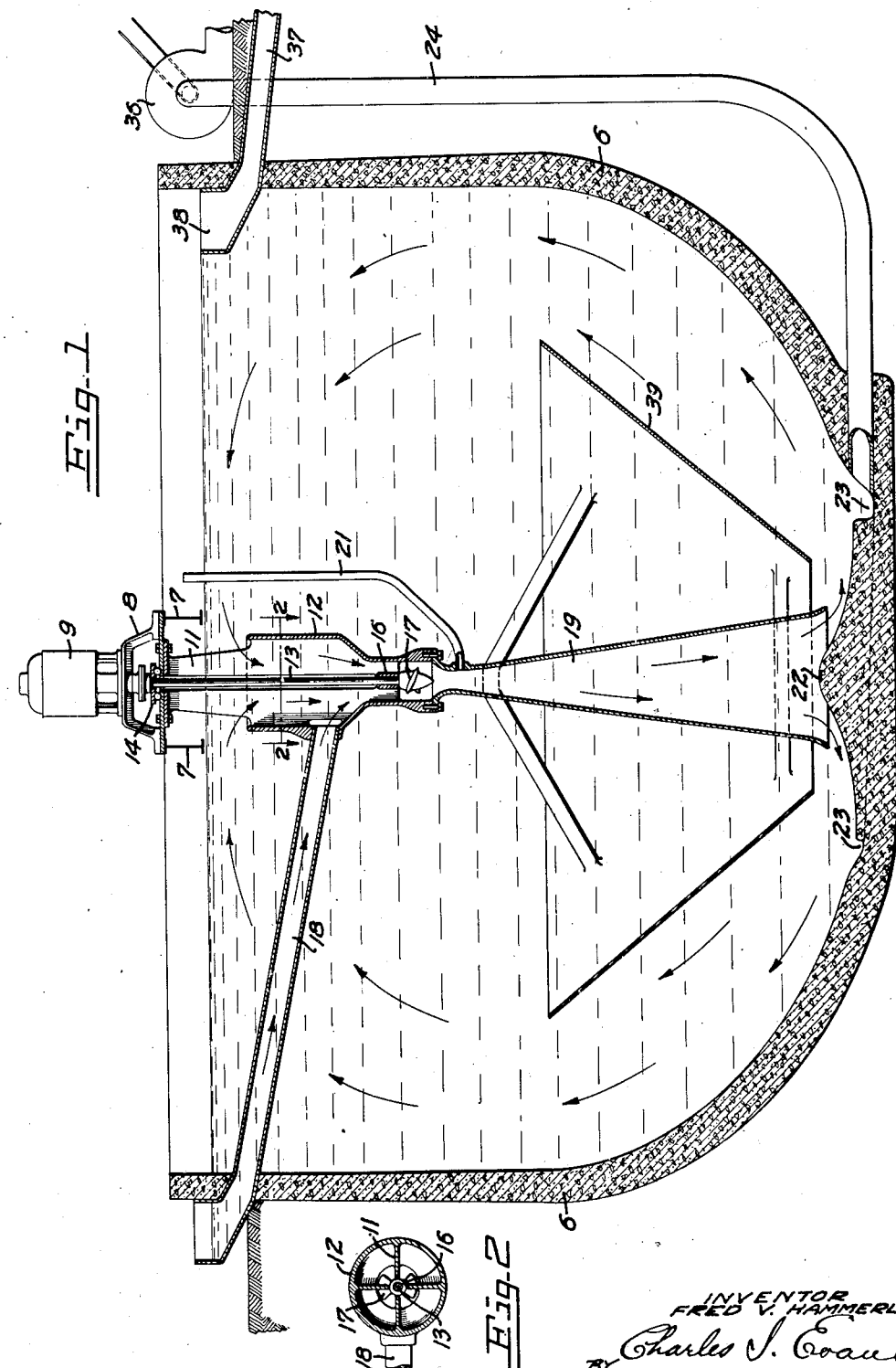
INVENTOR
FRED V. HAMMERLY
BY Charles J. Evans
HIS ATTORNEY.

Patented Mar. 7, 1933                                                           1,900,809

UNITED STATES PATENT OFFICE

FRED V. HAMMERLY, OF BERKELEY, CALIFORNIA, ASSIGNOR OF ONE-HALF TO CARROLL B. ABBOTT, OF BERKELEY, CALIFORNIA, AND ONE-HALF TO GEORGIA A. HAMMERLY, OF BERKELEY, CALIFORNIA

SEWAGE PURIFICATION SYSTEM

Application filed February 26, 1929. Serial No. 342,687.

My invention relates to systems for the biological purification of sewage, and particularly to systems in which large volumes of sewage must be handled.

An object of my invention is to provide a system which will expedite the biological purification of sewage.

Another object of my invention is to provide a purification system in which the air is equally and thoroughly diffused through all the sewage received, thereby maintaining a complete and continuous saturation with oxygen of the sewage at all times.

Still another object of my invention is to provide a sewage purification system in which relatively large volumes of sewage may be treated in a plant of relatively small size.

My invention possesses other objects and valuable features, some of which will be set forth in the following description of my invention which is illustrated in the drawing forming part of the specification. It is to be understood that I do not limit myself to the showing made by the said description and drawing, as I may adopt varying forms of my invention within the scope of the claims.

Of all methods which have been used for the purification of sewage, that of bio-chemical or bacterial purification has proved to be most effective. The method is not without its disadvantages, however, for care must be taken to assure a proper supply of air to the bacteria if their work is not to be excessively slow. In many instances this involves duplicate tank systems, in one of which the bacteria are aerating while the purification process is going forward in the other. This adds to the already very large area occupied by the plant, with a correspondingly large increase in fixed charges. By my invention the bacteria in each tank are constantly reaerated, with a corresponding increase in plant capacity and decrease in time of treatment.

In terms of broad inclusion, my invention comprises a tank for receiving the sewage, together with means for circulating the sewage in the tank and mixing it with controlled amounts of air. Means are also provided for discharging the purified liquid, and there is also preferably provided means for collecting and removing at intervals the small amount of solid matter of sludge which accumulates.

Referring to the drawing:

Figure 1 is an axial sectional view of the tank and circulating system; and

Figure 2 is a cross sectional view, taken on the line 2—2 of Fig. 1, of the circulating hopper.

In more detailed terms, a preferred embodiment of my invention comprises a tank 6, which may conveniently be of concrete, and which has a rounded or basin shaped bottom and approximately vertical walls. Extending across the top of the tank is a pair of girders 7, 7, upon which the circulating mechanism is supported.

Substantially centrally of the tank the girders carry a bracket 8 upon which is mounted the vertical shaft motor 9.

Hung from the girders beneath the motor by means of radial fins or webs 11 is a hopper 12, the top of the hopper being materially below the normal liquid level of the tank. An extension 13 of the motor shaft, which is supported by a thrust bearing 14, passes axially thru the hopper, and is journaled in a bearing 16. Immediately below the bearing an impeller screw 17 is mounted. The inlet duct 18 of the tank enters the side of the hopper above the impeller screw. Below the screw the hopper joins a Venturi tube 19, into the throat of which leads an air duct 21.

Below the outlet of the Venturi tube a deflector 22 is formed in the bottom of the tank for directing the flow parallel with the bottom and minimizing the formation of eddies at this point. Surrounding the deflector is a sump 23 for collecting solid matter or sludge precipitating from the tank. A duct 24 leads from the lowest point of the sump, which may be pumped out at appropriate intervals by means of the centrifugal pump 36, or other suitable mechanism.

The outlet pipe 37 is located near the edge of the tank and has a horizontal intake 38 which skims off the purified liquid from the top.

Although it is not essential to the operation of the system, it is desirable to provide a baffle 39, substantially concentric with the tank, for directing circulation in the tank and regulating the formation of eddies.

In operation the motor driven impeller forces the sewage in the tank down thru the hopper, the supporting fins 11 preventing excessive formation of vortices and consequent cavitation of the screw. Fresh sewage admitted thru the duct 18 comprises about 6 to 7% of the material handled by the screw and by it is thoroughly mixed with the other liquid, passing thru the throat of the venturi in a violently agitated state.

Air is drawn thru the duct and is entrained with the sewage at the throat of the tube, oxygen being dissolved therefrom until saturation obtains. This oxygen and the dissolved organic material are the food upon which the bacteria are propagated, their life processes fixing the oxygen to the organics to yield an innocuous product. Owing to the thorough distribution of the active culture thru the aerated sewage, which gives it an abundance of food in a favorable environment, the biological purification is carried on under the most favorable conditions.

Circulation from the mouth of the venturi follows the general course indicated by the arrows. After leaving the throat of the venturi, the velocities drop rapidly, giving time for the oxidizing action of the bacteria. Material in the tank passes thru the hopper on the average about sixteen times before it is discharged, each time reaerating the bacteria content, and inoculating the new supply of untreated sewage. The fully purified materials, being almost wholly liquid, gather at the relatively undisturbed edge of the tank and escape thru the outlet duct 37.

It will be realized that the size of a purification plant is directly proportional to the amount of material to be handled in a given time, multiplied by the length of time it must be stored to permit the bacteria to act. By introducing an ample supply of oxygen to maintain the bacteria it is desired to propagate and by insuring the immediate and thorough inoculation of all incoming material, this time is greatly reduced, with a corresponding decrease in size and expense of plant and an increase in dependability of operation. The cost of power consumed by my device is more than offset by the reduction of fixed charges.

I claim:

1. A sewage purification system comprising a tank having a basin-shaped bottom, a hopper disposed adjacent the center of the tank, an inlet duct feeding the hopper, a mechanically driven impeller for breaking up the sewage particles and for forcing the circulation of the sewage thru the hopper and against the tank bottom, and means for injecting air into the sewage after it has passed the impeller.

2. A sewage purification system comprising a tank, a hopper disposed in said tank in the upper part thereof, arranged to admit sewage from the tank into the hopper, a tube connected with the lower end of the hopper, discharging in the bottom part of the tank, and forming, with the hopper, a passage for sewage from the top portion of the tank to its bottom portion, a sewage inlet duct feeding into the hopper, an impeller located below the level of the sewage in the tank and adjacent the lower end of the hopper for agitating and circulating the sewage downwardly through the passage and an air duct for injecting air into the passage below the level of sewage in the tank and adjacent the impeller.

3. A sewage purification system comprising a tank having a basin-shaped bottom, a hopper disposed adjacent the center of the tank and arranged to admit the sewage from the tank into its upper portion, a Venturi tube connected with the outlet of the hopper and discharging adjacent the bottom of the tank, an inlet duct feeding into the hopper, an air duct connected with the throat of the Venturi tube, and a mechanically driven impeller for forcing the circulation of the sewage thru the hopper.

4. A sewage purification system comprising a tank having a basin-shaped bottom, a hopper disposed adjacent the center of the tank and arranged to admit the sewage from the tank into its upper portion, a Venturi tube connected with the outlet of the hopper and discharging adjacent the bottom of the tank, an inlet duct feeding into the hopper, an air duct connected with the throat of the Venturi tube, and a mechanically driven screw impeller for agitating and circulating the sewage thru the hopper.

5. A sewage purification system comprising a tank having a basin-shaped bottom, a hopper disposed adjacent the center of the tank and arranged to admit the sewage from the tank into its upper portion, a Venturi tube connected with the outlet of the hopper and discharging adjacent the bottom of the tank, an inlet duct feeding into the hopper, an air duct connected with the throat of the Venturi tube, a mechanically driven screw impeller for agitating and circulating the sewage thru the hopper, and means within the hopper for regulating the formation of vortices.

6. A sewage purification system comprising a tank having a basin-shaped bottom, a hopper disposed adjacent the center of the tank and arranged to admit the sewage from the tank into its upper portion, a Venturi tube connected with the outlet of the hopper and discharging adjacent the bottom of the tank, an inlet duct feeding into the hopper, an air duct connected with the throat of the Venturi tube, a deflector adjacent the discharge opening of the Venturi tube for directing the circulation therefrom along the bottom of the tank, and means for forcing circulation of the sewage thru the hopper and the Venturi tube.

7. A sewage purification system comprising a tank having a basin-shaped bottom, a hopper disposed adjacent the center of the tank and arranged to admit the sewage from the tank into its upper portion, a Venturi tube connected with the outlet of the hopper and discharging adjacent the bottom of the tank, an inlet duct feeding into the hopper, an air duct connected with the throat of the Venturi tube, a deflector adjacent the discharge opening of the Venturi tube for directing the circulation therefrom along the bottom of the tank, a sump surrounding the deflector, means for removing material collected by the sump, and means for forcing circulation of the sewage thru the hopper and the Venturi tube.

8. A sewage purification system comprising a tank, a hopper disposed adjacent the upper part of the tank and arranged to admit the sewage from the tank into its upper portion, an inlet duct feeding the hopper with raw sewage, an impeller positioned below the hopper for breaking up the sewage particles and for forcing circulation of the mixed raw and tank sewage thru the hopper in a downwardly moving stream, and a duct opening into said stream below the impeller for introducing air into the streaming sewage mixture after it has passed the impeller.

In testimony whereof, I have hereunto set my hand.

FRED V. HAMMERLY.